(12) United States Patent
Park (10) Patent No.: US 12,397,754 B2
(45) Date of Patent: Aug. 26, 2025

(54) SYSTEM AND METHOD FOR CONTROLLING DRIVING OF VEHICLE

(71) Applicant: Hyundai Mobis Co., Ltd., Seoul (KR)

(72) Inventor: Ge O Park, Seoul (KR)

(73) Assignee: Hyundai Mobis Co., Ltd., Seoul (KR)

( * ) Notice: Subject to any disclaimer, the term of this patent is extended or adjusted under 35 U.S.C. 154(b) by 286 days.

(21) Appl. No.: 17/333,359

(22) Filed: May 28, 2021

(65) Prior Publication Data

US 2021/0380082 A1 Dec. 9, 2021

(30) Foreign Application Priority Data

Jun. 4, 2020 (KR) .................. 10-2020-0067939

(51) Int. Cl.
*B60T 7/12* (2006.01)

(52) U.S. Cl.
CPC ............. *B60T 7/12* (2013.01); *B60T 2201/16* (2013.01); *B60T 2210/24* (2013.01); *B60T 2210/32* (2013.01)

(58) Field of Classification Search
CPC .... B60T 7/12; B60T 2201/16; B60T 2210/24; B60T 2210/32
See application file for complete search history.

(56) References Cited

U.S. PATENT DOCUMENTS

| | | | | |
|---|---|---|---|---|
| 4,519,469 A | * | 5/1985 | Hayashi ................. | B60K 31/04 180/170 |
| 5,751,211 A | * | 5/1998 | Shirai ................... | B60W 10/10 340/904 |
| 10,614,688 B1 | * | 4/2020 | Pachikov ............... | G08B 31/00 |
| 2004/0193347 A1 | * | 9/2004 | Harumoto .............. | G08G 1/166 701/45 |
| 2008/0059037 A1 | | 3/2008 | Isaji et al. | |

(Continued)

FOREIGN PATENT DOCUMENTS

CN 104678832 A 6/2015
CN 105313897 A 2/2016

(Continued)

OTHER PUBLICATIONS

Chinese Office Action issued on May 11, 2023, in corresponding Chinese Patent Application No. 202110606027.5 (12 pages in English, 10 pages in Chinese).
Korean Office Action Issued on Jun. 18, 2025, in Counterpart Korean Patent Application No. 10-2020-0067939 (6 Pages in English, 6 Pages in Korean).

*Primary Examiner* — Dale W Hilgendorf
*Assistant Examiner* — Hana Lee
(74) *Attorney, Agent, or Firm* — NSIP Law (57) ABSTRACT

Methods and systems for controlling driving of a vehicle are disclosed, where line system includes one or more processors configured to identify objects, including another vehicle, around a host vehicle and collect object information about the objects, to collect road states information of road states in a traveling direction of the host vehicle, to check the object information around the host vehicle and the road states information to identify a safety zone to which the host vehicle is able to travel, and to control the host vehicle to travel to the safety zone when the other vehicle is detected in the traveling direction of the host vehicle in a state in which the host vehicle has entered a curved road.

12 Claims, 4 Drawing Sheets

(56) References Cited

U.S. PATENT DOCUMENTS

| | | | |
|---|---|---|---|
| 2008/0312834 A1* | 12/2008 | Noda | B60T 7/22 |
| | | | 701/301 |
| 2018/0025643 A1* | 1/2018 | Yamamoto | B60K 31/00 |
| | | | 701/23 |
| 2019/0047557 A1* | 2/2019 | Kim | B60W 40/068 |
| 2019/0176887 A1 | 6/2019 | Yasuda | |
| 2019/0291730 A1* | 9/2019 | Kamiya | G06V 20/58 |
| 2019/0337533 A1* | 11/2019 | Kume | B60K 35/28 |
| 2020/0239021 A1* | 7/2020 | Igarashi | B60K 35/22 |
| 2021/0122364 A1* | 4/2021 | Lee | G06F 18/2413 |
| 2021/0213918 A1* | 7/2021 | Chen | B60T 8/00 |
| 2022/0234615 A1* | 7/2022 | Nishino | B60W 60/0011 |

FOREIGN PATENT DOCUMENTS

| | | |
|---|---|---|
| CN | 109383499 A | 2/2019 |
| CN | 110239531 A | 9/2019 |
| JP | 2000-67398 A | 3/2000 |
| KR | 1997-0036373 A | 7/1997 |
| KR | 10-2017-0040604 A | 4/2017 |
| KR | 10-2018-0040092 A | 4/2018 |
| KR | 10-2019-0017340 A | 2/2019 |
| KR | 10-2019-0124069 A | 11/2019 |

* cited by examiner

SYSTEM AND METHOD FOR CONTROLLING DRIVING OF VEHICLE

CROSS-REFERENCE TO RELATED APPLICATION

This application claims the benefit of Korean Patent Application No. 10-2020-0067939, filed on Jun. 4, 2020 in the Korean Intellectual Property Office, the disclosure of which is incorporated herein by reference.

BACKGROUND OF THE INVENTION

1. Field of the Invention

The present invention relates to a system and method for controlling driving of a vehicle to ensure safety during driving on a curved road.

2. Description of the Related Art

Vehicles frequently travel on curved roads as well as straight roads. During driving on a curved road, risk of collision with an oncoming vehicle increases because the view of a curved section is not secured in front of a vehicle.

That is, the recognition ability of a driver deteriorates in a situation in which the driver drives a vehicle on a curved road because the view of a curved section is not secured, and thus the driver cannot deal with the situation. Particularly, risk of collision further increases during driving on an inclined curved road.

On such a curved road, a message is conveyed through a road sign in order to prevent risk of collision. However, even if a driver recognizes the risk through the road sign, it is difficult for the driver to cope with a sudden oncoming vehicle on a curved road.

Accordingly, there is need for a method for rapidly determining presence or absence of an object in a vehicle traveling direction during traveling on a curved road and rapidly responding to a determination result to avoid collision of a vehicle.

It will be understood that the above matters described in the related art are merely for promotion of understanding of the background of the invention and should not be recognized as prior art well-known to those skilled in the art.

SUMMARY OF THE INVENTION

Therefore, the present invention has been made in view of the above problems, and it is an object of the present invention to provide a system and method for controlling driving of a vehicle to ensure driving safety by avoiding an oncoming vehicle when the vehicle travels on a curved road.

In one general aspect, a system for controlling driving of a vehicle, includes one or more processors configured to: identify objects, including another vehicle, around a host vehicle and collect object information about the objects; collect road states information of road states in a traveling direction of the host vehicle; check the object information around the host vehicle and the road states information to identify a safety zone to which the host vehicle is able to travel; and control the host vehicle to travel to the safety zone when the other vehicle is detected in the traveling direction of the host vehicle in a state in which the host vehicle has entered a curved road.

The system may further include a memory configured to store instructions. The one or more processors may be further configured to execute the instructions to configure the one or more processors to: identify the objects, including the other vehicle, around the host vehicle and collect the object information about the objects; collect the road states information of the road states in the traveling direction of the host vehicle; check the object information and the road states information to identify the safety zone to which the host vehicle is able to travel; and control the host vehicle to travel to the safety zone when the other vehicle is detected in the traveling direction of the host vehicle in the state in which the host vehicle has entered the curved road.

The processor may include an object detection unit configured to identify the objects, including the other vehicle, around the host vehicle and collect the object information about the objects; a road detection unit configured to collect the road states information of the road states in the traveling direction of the host vehicle; a safety confirmation unit configured to check the object information and the road states information to identify the safety zone to which the host vehicle is able to travel; and a driving control unit configured to control the host vehicle to travel to the safety zone when the other vehicle is detected in the traveling direction of the host vehicle in the state in which the host vehicle has entered the curved road.

The driving control unit may be further configured to control the host vehicle to travel in a direction opposite to a direction in which the other vehicle approaches the host vehicle upon detection of the other vehicle on the curved road.

The safety confirmation unit may be further configured to not set a range extending beyond a centerline in lanes around the host vehicle as a safety zone.

The safety confirmation unit may be further configured to determine an object risk level of the object information around the host vehicle and a road state in the safety zone. The driving control unit may be further configured to brake the host vehicle depending on the object risk level such that a traveling speed of the host vehicle is reduced when the host vehicle travels to the safety zone.

The safety confirmation unit may be further configured to set a safe distance between the host vehicle and an object when the object is present in the safety zone. The driving control unit may be further configured to cause the host vehicle to be separated from the object by the safe distance or longer when traveling to the safety zone.

The safety confirmation unit may be further configured to determine a distance risk level of a distance between the host vehicle and the other vehicle and a relative speed of the other vehicle. The driving control unit may be further configured to correct braking power and braking timing depending on the distance risk level.

The safety confirmation unit may be further configured to increase the distance risk level when the distance between the host vehicle and the other vehicle is equal to or less than a predetermined reference distance. The driving control unit may be further configured to upwardly correct the braking power and the braking timing depending on the increase of the distance risk level.

The safety confirmation unit may be further configured to increase the distance risk level when the relative speed of the other vehicle is equal to or higher than a predetermined reference speed. The driving control unit may be further configured to upwardly correct the braking power and the braking timing depending on the increase of the distance risk level.

The safety confirmation unit may be further configured to decrease the object risk level when the road state is determined to be an uphill road and increase the object risk level when the road state is determined to be a downhill road.

The safety confirmation unit may be further configured to increase the object risk level when the road state is determined to be an unpaved road.

The safety confirmation unit may be further configured to increase the object risk level when the road state is determined to be a slippery condition.

The object detection unit may be further configured to identify road signs and collect road information through the road signs. The safety confirmation unit may be further configured to determine a road information risk level based on the road information collected through the road signs.

The one or more processors may be included in engine control units (ECUs).

In another general aspect, a method for controlling driving of a vehicle, includes an object detection operation of identifying objects, including another vehicle, around a host vehicle and collecting object information about the objects, a road detection operation of collecting road states information of road states in a traveling direction of the host vehicle, a safety confirmation operation of checking the object information around the host vehicle and road states information to identify a safety zone to which the host vehicle is able to travel, and a driving control operation of controlling the host vehicle to travel to the safety zone when the other vehicle is detected in the traveling direction of the host vehicle in a state in which the host vehicle has entered a curved road.

The host vehicle may be controlled to travel in a direction opposite to a direction in which the other vehicle approaches the host vehicle upon detection of the other vehicle on the curved road in the driving control operation.

A range extending beyond a centerline in lanes around the host vehicle may not be set as a safety zone in the safety confirmation operation.

An object risk level may be determined according to information about objects around the host vehicle and a road state in the safety zone in the safety confirmation operation. The host vehicle may be braked depending on the object risk level such that a traveling speed of the host vehicle is reduced when the host vehicle travels to the safety zone in the driving control operation.

A safe distance between the host vehicle and an object may be set when the object is present in the safety zone in the safety confirmation operation. The host vehicle may be caused to be separated from the object by the safe distance or longer when traveling to the safety zone in the driving control operation.

A distance risk level may be determined according to a distance between the host vehicle and the other vehicle and a relative speed of the other vehicle in the safety confirmation operation. Braking power and braking timing may be corrected depending on the distance risk level in the driving control operation.

The distance risk level may be increased when the distance between the host vehicle and the other vehicle is equal to or less than a predetermined reference distance in the safety confirmation operation. The braking power and the braking timing may be upwardly corrected depending on the increase of the distance risk level in the driving control operation.

The distance risk level may be increased when the relative speed of the other vehicle is equal to or higher than a predetermined reference speed in the safety confirmation operation. The braking power and the braking timing may be upwardly corrected depending on the increase of the distance risk level in the driving control operation.

The object risk level may be decreased when the road state is determined to be an uphill road and increased when the road state is determined to be a downhill road in the safety confirmation operation.

The object risk level may be increased when the road state is determined to be an unpaved road in the safety confirmation operation.

The object risk level may be increased when the road state is determined to be a slippery condition in the safety confirmation operation.

Road signs may be identified and road information may be collected through the road signs in the object detection operation. A road information risk level may be determined based on the road information collected through the road signs in the safety confirmation operation.

A non-transitory computer-readable storage medium may store instructions that, when executed by one or more processors, cause the one or more processors to perform the method above.

Other features and aspects will be apparent from the following detailed description, the drawings, and the claims.

DETAILED DESCRIPTION OF THE PREFERRED EMBODIMENTS

Hereinafter, a system and method for controlling driving of a vehicle according to preferred embodiments of the present invention will be described with reference to the accompanying drawings.

Figure 1:
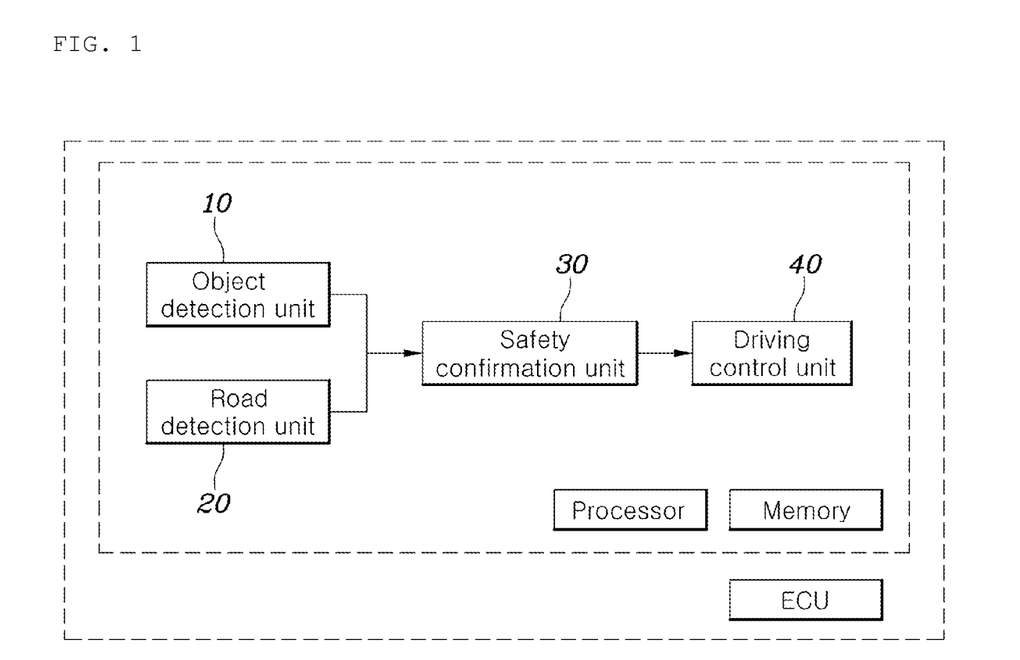
FIG. 1 is a configuration diagram of a system for controlling driving of a vehicle according to the present invention.
Figure 2:
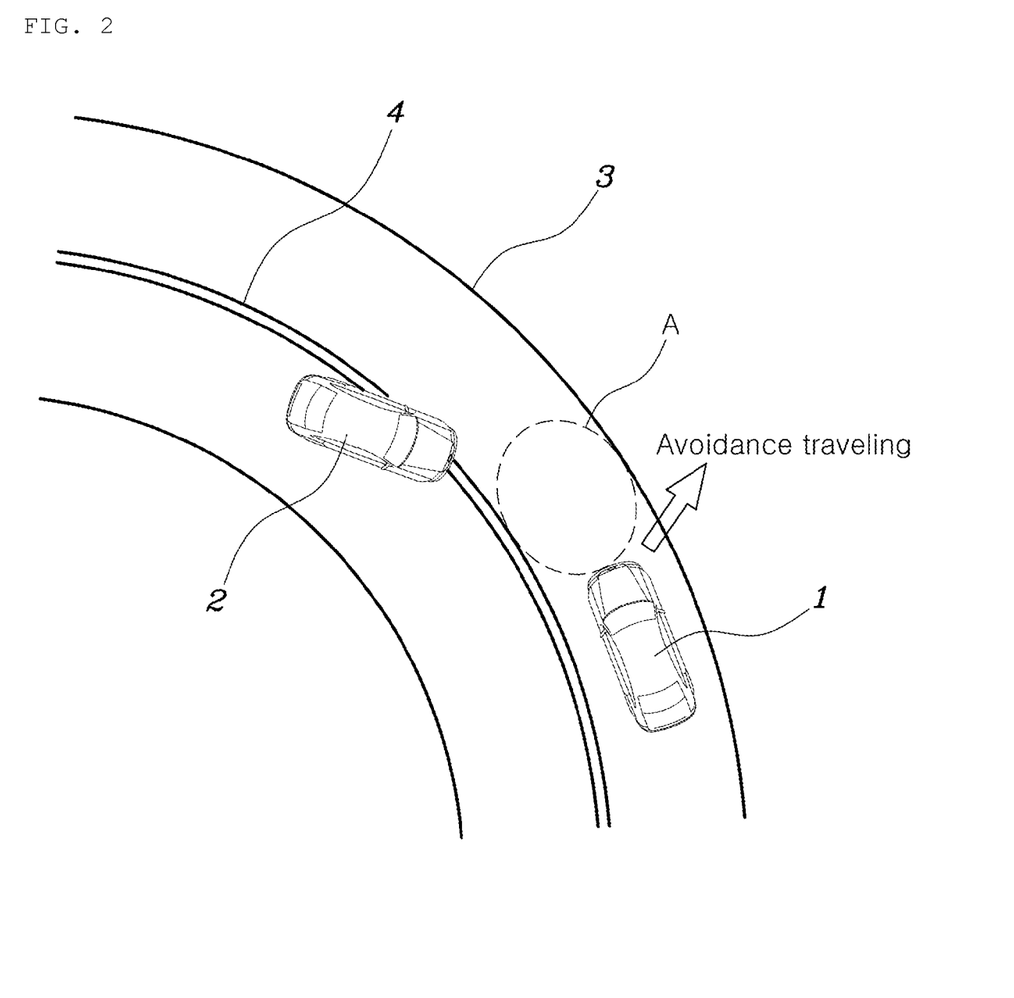
FIG. 2 is a diagram showing avoidance traveling according to the system for controlling driving of a vehicle illustrated in FIG. 1.
Figure 3:
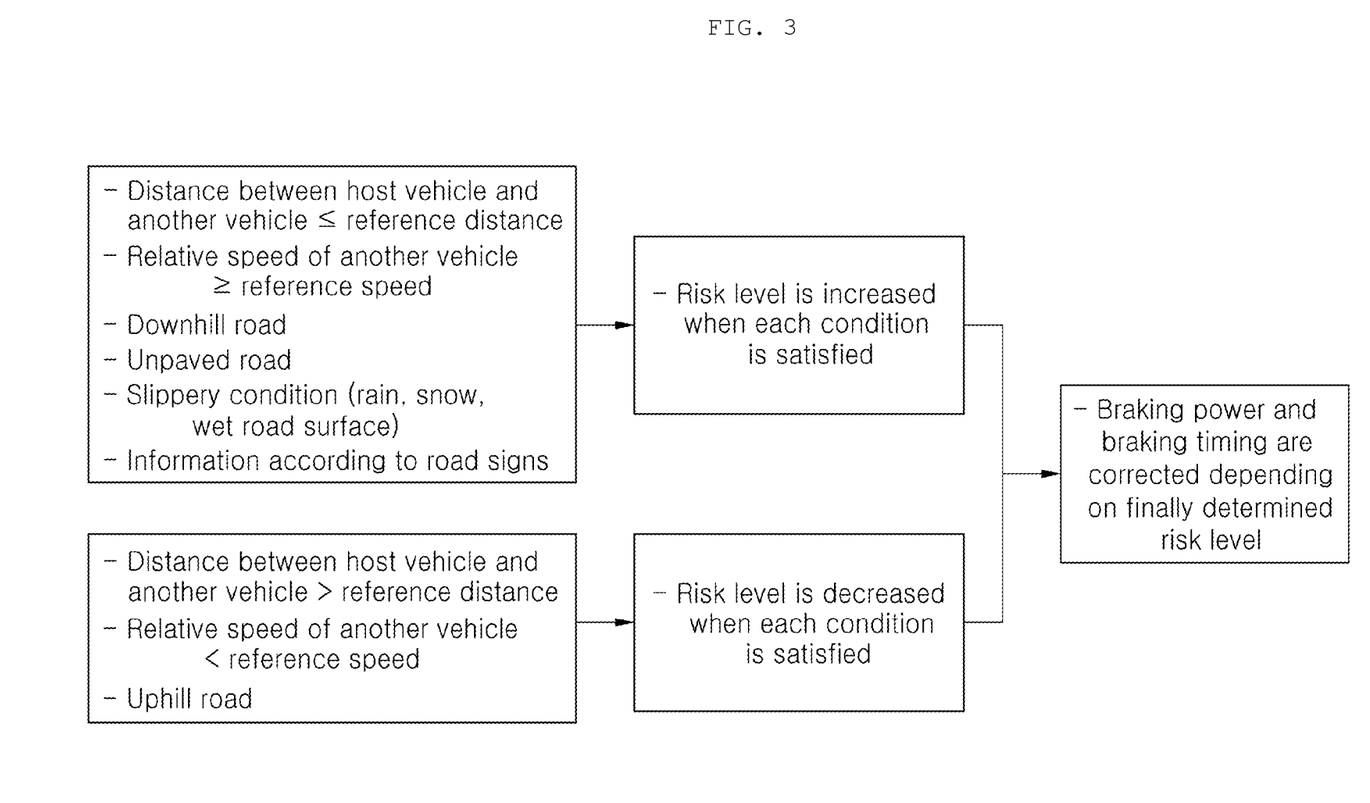
FIG. 3 is a diagram for describing the system for controlling driving of a vehicle illustrated in FIG. 1.
Figure 4:
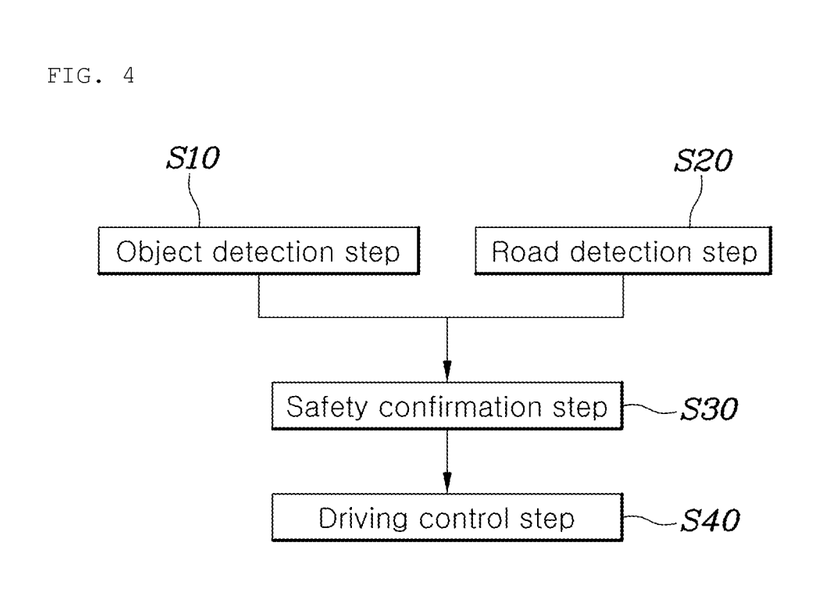
FIG. 4 is a flowchart of a method for controlling driving of a vehicle according to the present invention.

FIG. 1 is a configuration diagram of a system for controlling driving of a vehicle according to the present invention, FIG. 2 is a diagram showing avoidance traveling according to the system for controlling driving of a vehicle illustrated in FIG. 1, FIG. 3 is a diagram for describing the system for controlling driving of a vehicle illustrated in FIG. 1, and FIG. 4 is a flowchart of a method for controlling driving of a vehicle according to the present invention.

The present invention may be applied to a vehicle driven by a driver and may also be applied to an autonomous vehicle. That is, the present invention allows a driver to escape from a situation in which risk of collision may occur, which cannot be recognized by the driver, and driving may be performed not only by the driver but also according to control of an ECU.

The ECU refers to a hardware device including a memory and a processor configured to execute one or more steps interpreted as an algorithm structure. The memory stores algorithm steps, and the processor executes the algorithm steps to perform one or more processes of a method in accordance with various exemplary embodiments of the present invention. The ECU according to exemplary embodiments of the present invention may be implemented through a nonvolatile memory configured to store algorithms for controlling operation of various components of a vehicle or data about software commands for executing the algorithms, and a processor configured to perform operation to be described above using the data stored in the memory. The memory and the processor may be individual chips. Alternatively, the memory and the processor may be integrated in a single chip. The processor may be implemented as one or more processors.

Further, the processor may be operated by a predetermined program which may include a series of commands for carrying out a method in accordance with various exemplary embodiments of the present invention.

As illustrated in FIG. 1, the system for controlling driving of a vehicle according to the present invention includes an object detection unit 10 that identifies objects including another vehicle 2 around a host vehicle 1 and collects information about the objects, a road detection unit 20 that collects information regarding road states in a traveling direction of the host vehicle 1, a safety confirmation unit 30 that checks information about objects around the host vehicle 1 and road states to identify a safe zone A to which the host vehicle 1 can travel, and a driving control unit 40 that controls the host vehicle 1 to travel to the safe zone A when the other vehicle 2 is detected in the traveling direction of the host vehicle 1 in a state in which the host vehicle 1 has entered a curved section.

Here, the object detection unit 10 may collect information about the other vehicle 2 around the host vehicle 1 from various sensors. The sensors may be a LiDAR, a camera, a radar, and an ultrasonic sensor and they may acquire information regarding the shape, size, speed, distance, and the like of the other vehicle 2 and recognize various obstacles 3.

The road detection unit 20 may be configured as the same sensors of the object detection unit 10, detect road states, and additionally receive weather information through a navigation system and acquire various types of road information about straight roads, curved roads, uphill roads, and downhill roads.

Information about the other vehicle 2 and roads input through the object detection unit 10 and the road detection unit 20 in this manner is provided to the safety confirmation unit 30, and the safety confirmation unit 30 identifies the safe zone A to which the host vehicle 1 can travel on the basis of the input information. Here, the safe zone A is an area in which the host vehicle 1 is safe from interference from the other vehicle 2 or the obstacles 3 when traveling thereto and may be set depending on a traveling route of the other vehicle 2 and presence or absence of the other vehicle 2 or obstacles 3. Accordingly, the driving control unit 40 controls the host vehicle 1 to travel to the safe zone A secured through the safety confirmation unit 30 such that the host vehicle 1 avoids collision with the other vehicle 2 traveling in the opposite direction when the road detection unit 20 detects the host vehicle 1 entering a curved section and the object detection unit 10 detects the other vehicle 2 in the traveling direction. In this manner, the present invention improves driving safety on a curved road having a high accident rate to provide driving reliability to passengers.

The present invention will be described in detail. As illustrated in FIG. 2, the driving control unit 40 may control the host vehicle 1 to travel in a direction opposite to a direction in which the other vehicle 2 travels toward the host vehicle 1 upon detection of the other vehicle 2 on a curved road. The driving control unit 40 controls traveling of the host vehicle 1 and, when the other vehicle 2 approaches the host vehicle 1, controls the host vehicle 1 to travel to the safe zone A such that the host vehicle 1 avoid collision with the other vehicle 2. Here, the driving control unit 40 may cause the host vehicle 1 to travel in a direction opposite to a direction in which the other vehicle 2 approaches in the safe zone A around the host vehicle 1 such that the host vehicle 1 can avoid the oncoming vehicle 2 to prevent collision with the other vehicle 2.

The safety confirmation unit 30 does not set a range extending beyond a centerline 4 in lanes around the host vehicle 1 as the safe zone A.

A road is divided into lanes that define the same traveling direction and lanes that define an opposite traveling direction. Particularly, the centerline 4 divides lanes in opposite traveling directions, and accident risk is very high when a vehicle passes the centerline 4.

Accordingly, the safety confirmation unit 30 sets an area in which there is no other vehicles 2 or obstacles 3 as the safe zone A and sets the safe zone A such that it does not extend beyond the centerline 4 such that collision with a vehicle in an opposite lane is avoided.

The safety confirmation unit 30 may determine and classify risk levels according to information about objects around the host vehicle 1 and road states in the safety zone A, and the driving control unit 40 may brake the host vehicle 1 in response to a risk level such that a traveling speed of the host vehicle 1 decreases when the host vehicle 1 travels to the safe zone A.

The safety confirmation unit 30 classifies risk levels according to object information and road information when setting the safe zone A in this manner, and thus efficient braking can be performed at the time of braking a vehicle through the driving control unit 40. Accordingly, when the road detection unit 20 detects the host vehicle 1 entering a curved section and the object detection unit 10 detects the other vehicle 2 in the traveling direction of the host vehicle 1, the driving control unit 40 causes the host vehicle 1 to travel to the safe zone A such that the host vehicle 1 avoids collision with the oncoming vehicle 2 in the opposite direction. In addition, the driving control unit 40 performs braking such that the host vehicle 1 reduces the traveling speed thereof depending on a risk level determined through the safety confirmation unit 30 such that the host vehicle 1 avoids collision with the other vehicle 2 efficiently and stably. Further, even if the host vehicle 1 fails to perfectly avoid collision with the other vehicle 2, impact due to collision is reduced according to braking of the host vehicle 1.

Specifically, the safety confirmation unit 30 may determine and classify a risk level according to a distance between the host vehicle 1 and the other vehicle 2 and a relative speed of the other vehicle 2, and the driving control unit 40 may correct braking power and braking timing depending on the risk level.

The safety confirmation unit 30 classifies risk levels according to distances between the host vehicle 1 and objects and a relative speed of the other vehicle 2 in this manner such that braking power and braking timing are corrected depending on a determined risk level. Then, the driving control unit 40 corrects braking power and braking timing to a risk level determined through the safety confirmation unit such that the host vehicle 1 stably avoids the other vehicle 2. That is, when the distance between the host vehicle 1 and the other vehicle 2 is short or the relative speed of the other vehicle 2 is high, risk of collision with the other vehicle 2 is high. In this case, braking pressures is increased to perform strong braking, and braking timing is advanced to rapidly perform braking. On the other hand, when the distance between the host vehicle 1 and the other vehicle 2 is long or the relative speed of the other vehicle 2 is low, risk of collision with the other vehicle 2 is low and thus smooth braking is performed.

Here, risk levels may be divided into a plurality of stages. For example, the safe zone A is set to risk level 0 when there is no object in the safe zone A, the risk level is increased to stage 1 to upwardly correct braking power and braking timing when the host vehicle 1 approaches an object, and the risk level is further increased to stage 2 to upwardly correct braking power and braking timing when the relative speed of the other vehicle 2 is high. Here, upwardly correcting the braking power is to increase braking pressure, and braking powers capable of ensuring safety according to distances between the host vehicle 1 and the other vehicle 2 may be stored in advance. Furthermore, upwardly correcting the braking timing is to advance the braking timing, and braking timings capable of ensuring safety according to distances between the host vehicle 1 and the other vehicle 2 may be stored in advance.

When the driving control unit 40 causes the host vehicle 1 to travel to the safe zone A upon detection of the other vehicle 2 in a state in which the host vehicle has entered a curved section and brakes the host vehicle 1 with braking power at braking timing depending on a risk level determined through the safety confirmation unit 30 in this manner, a sufficient time for which the host vehicle 1 can avoid the other vehicle 2 is secured and thus the host vehicle 1 can easily avoid the other vehicle 2. Furthermore, even if the host vehicle 1 cannot avoid the other vehicle 2, the traveling speed is reduced according to rapid braking to decrease impact.

More specifically, the safety confirmation unit 30 may increase a risk level when the distance between the host vehicle 1 and the other vehicle 2 is equal to or less than a predetermined reference distance, and the driving control unit 40 may upwardly correct braking power and braking timing depending on the increased risk level. Here, the reference distance is a prestored value, which may be set according to a braking distance depending on the size and weight of the host vehicle 1.

That is, when the distance between the host vehicle 1 and the other vehicle 2 is equal to or less than the reference distance, risk of collision with the other vehicle 2 is high, and thus the risk level is increased and braking power and braking timing are upwardly corrected such that avoidance of collision between the host vehicle 1 and the other vehicle 2 is stably performed through strong braking.

When the safety confirmation unit 30 adjusts the risk level according to the distance between the host vehicle 1 and the other vehicle 2, the driving control unit 40 causes the host vehicle 1 to travel to the safe zone A and, simultaneously, brakes the host vehicle 1 with the braking power at the braking timing corrected depending on the risk level upon detection of the other vehicle 2 in a state in which the host vehicle 1 has entered a curved section. Accordingly, rapid and strong braking is performed with the increased braking power at the advanced braking timing depending on the increased risk level, and thus a time for which the host vehicle 1 can avoid the other vehicle 2 is secured. Therefore, the host vehicle 1 can easily avoid the other vehicle 2 and, even if the host vehicle 1 cannot avoid the other vehicle 2, the traveling speed is reduced according to rapid braking to decrease impact.

Meanwhile, when the relative speed of the other vehicle 2 is equal to or higher than a predetermined reference speed, the safety confirmation unit 30 may increase a risk level, and the driving control unit 40 may upwardly correct braking power and braking timing depending on the increased risk level.

That is, the object detection unit 10 may collect speed information about the other vehicle 2, and the safety confirmation unit 30 may determine a risk level by receiving the speed information about the other vehicle 2 and comparing the speed information with the prestored reference speed. That is, when the speed of the other vehicle 2 approaching the host vehicle 1 is high, the host vehicle 1 may slowly respond to the other vehicle 1 or impact may increase in case of collision, and thus the risk level is adjusted depending on the speed of the other vehicle 2.

Specifically, when the relative speed of the other vehicle 2 is equal to or higher than the reference speed, the safety confirmation unit 30 increases the risk level. Here, the reference speed is a speed at which the host vehicle 1 can respond to and avoid the other vehicle 2 approaching the host vehicle 1 and is derived and stored in advance. That is, when the relative speed of the other vehicle 2 is equal to or higher than the reference speed, risk of collision between the host vehicle 1 and the other vehicle 2 increases, and thus the safety confirmation unit 30 increases the risk level and the driving control unit 40 upwardly corrects braking power and braking timing depending on the increased risk level to rapidly brake the host vehicle 1. Accordingly, the host vehicle 1 can respond to the other vehicle 2 detected in a curved section and safely avoid the other vehicle 2. Even if the host vehicle 1 cannot avoid the other vehicle 2, impact is reduced according to rapid braking.

Meanwhile, when an object is present in the safe zone A, the safety confirmation unit 30 may set a safe distance between the host vehicle 1 and the object, and the driving control unit 40 may cause the host vehicle 1 to be separated from the object by the safe distance or longer when the host vehicle 1 travels to the safe zone A.

That is, various obstacles such as a guardrail 3 may be located on a road in addition to vehicles. Accordingly, the driving control unit 40 receives information about the obstacle 3 through the object detection unit 10 and controls a vehicle such that the vehicle travels in an area where the obstacle 3 is not present or travels while maintaining the safe distance or longer from the obstacle 3. Here, the safe distance may be set according to the shape and size of the host vehicle 1 and set to a distance at which the host vehicle 1 does not collide with the obstacle 3 to avoid collision.

By confirming the obstacle 3 around the host vehicle 1 and avoiding collision with the other vehicle 2 in consideration of the obstacle 3 in this manner, driving stability is further secured.

The safety confirmation unit 30 may decrease a risk level when a road state is determined to be an uphill road and increase the risk level when a road state is determined to be a downhill road.

That is, when the host vehicle 1 travels on an uphill road, the host vehicle 1 can be rapidly braked even with low braking power. Accordingly, the safety confirmation unit 30 decreases the risk level such that the driving control unit 40 brakes the host vehicle 1 with downwardly corrected braking power at downwardly corrected braking timing when the host vehicle 1 travels on an uphill road. Accordingly, when the other vehicle 2 is detected in a curved section, excessive braking is prevented from making a passenger feel uncomfortable in a situation in which the host vehicle 1 can avoid the other vehicle 2. On the other hand, when the host vehicle 1 travels on a downhill road, the host vehicle may be slowly braked even with high braking power. Accordingly, the safety confirmation unit 30 increases the risk level such that the driving control unit 40 brakes the host vehicle 1 with upwardly corrected braking power at upwardly corrected braking timing when the host vehicle 1 travels on a downhill road. Accordingly, when the other vehicle 2 is detected in a curved section, the host vehicle 1 is stably braked according to rapid and strong braking and thus can safely avoid the other vehicle 2.

When a road state is determined to be an unpaved road, the safety confirmation unit 30 may increase the risk level. Normal braking can be performed in the case of a paved road, whereas normal braking may not be performed due to an uneven road surface in the case of an unpaved road. Accordingly, when the host vehicle 1 enters an unpaved road, the safety confirmation unit 30 increases the risk level such that the driving control unit 40 upwardly corrects braking power and braking timing to perform stable braking. By rapidly braking the host vehicle 1 with high braking power in this manner, the host vehicle 1 can avoid collision with the other vehicle 2 even on an unpaved road.

Further, when a road state is determined to be a slippery condition, the safety confirmation unit 30 may increase the risk level. Here, the road detection unit 20 may identify an environment having a slippery road surface through weather information, a rain sensor, and the like and transmit information on the environment to the safety confirmation unit 30.

When a road state is determined to be a slippery condition through the road detection unit 20 in this manner, the safety confirmation unit 30 may increase the risk level such that the driving control unit 40 upwardly corrects braking power and braking timing depending on the increased risk level. Accordingly, even when the host vehicles 1 skids during braking, the host vehicle 1 can be stably braked.

The object detection unit 10 may identify road signs and collect road information through the road signs, and the safety confirmation unit 30 may determine a risk level on the basis of road information collected through road signs.

Various road signs for providing road information to drivers are provided on roads. Particularly, road signs are provided to allow drivers to recognize frequent accident zones, steep slopes, and sharp curved sections in advance. Accordingly, the object detection unit 10 may identify road signs and collect information on a road on which the host vehicle 1 is traveling to determine a degree of risk of the road. Risk levels may be set according to information on road signs, and risk levels may be subdivided according to gradients or curve angles. Such risk levels according to road signs may be stored in the safety confirmation unit 30 in advance. When the safety confirmation unit 30 determines a risk level on the basis of road signs, the driving control unit 40 may correct braking power and braking timing to the determined risk level.

As described above, the present invention can perform stable and precise braking control in accordance with various road situations by setting a risk level according to each situation through the safety confirmation unit 30 and upwardly or downwardly correcting braking power and braking timing depending on a set risk level through the driving control unit 40.

A method for controlling driving of a vehicle according to the present invention includes an object detection step S10 of identifying objects including the other vehicle 2 around the host vehicle 1 and collecting information about the objects, a road detection step S20 of collecting information regarding road states in a traveling direction of the host vehicle 1, a safety confirmation step S30 of checking information about objects around the host vehicle 1 and road states to identify a safe zone A to which the host vehicle 1 can travel, and a driving control step S40 of controlling the host vehicle 1 to travel to the safe zone A when the other vehicle 2 is detected in the traveling direction of the host vehicle 1 in a state in which the host vehicle 1 has entered a curved section, as illustrated in FIG. 4.

Accordingly, when the host vehicle 1 enters a curved section and the other vehicle 2 is detected in the traveling direction of the host vehicle 1, the host vehicle 1 is caused to travel to the safe zone A and thus avoids collision with the other vehicle 2 traveling in the opposite direction. In this manner, the present invention improves driving safety on a curved road having a high accident rate to provide driving reliability to passengers.

In the driving control step S40, the host vehicle 1 is controlled to travel in a direction opposite to a direction in which the other vehicle 2 approaches the host vehicle 1 such that the host vehicle 1 can avoid the oncoming vehicle to prevent collision with the other vehicle 2 when the other vehicle 2 is detected in a curved section.

In the safety confirmation step S30, a range out of a centerline 4 in lanes around the host vehicle 1 is not set as the safe zone A such that the host vehicle 1 avoids collision with a vehicle in the opposite lane beyond the centerline 4.

In the safety confirmation step S30, risk levels are determined and classified according to information about objects around the host vehicle 1 and road states in the safety zone A. In the driving control step S40, the host vehicle 1 may be braked in response to a risk level to reduce a traveling speed when traveling to the safe zone A. Accordingly, in the driving control step S40, the host vehicle 1 is braked such that the traveling speed thereof is reduced depending on the risk level determined through the safety confirmation step S30, and thus the host vehicle 1 may easily avoid collision with the other vehicle 2. Further, even if the host vehicle 1 fails to perfectly avoid the other vehicle 2, impact due to collision is reduced according to braking of the host vehicle 1.

When an object is present in the safe zone A, a safe distance between the host vehicle 1 and the object may be set in the safety confirmation step S30, and the host vehicle 1 may be separated from the object by the safe distance or longer when traveling to the safe zone A in the driving control step S40. By confirming the obstacle 3 around the host vehicle 1 and avoiding collision with the other vehicle 2 in consideration of the obstacle 3 in this manner, driving stability is further secured.

Further, a risk level may be determined and classified according to a distance between the host vehicle 1 and the other vehicle 2 and a relative speed of the other vehicle 2 in the safety confirmation step S30, and braking power and braking timing may be corrected depending on the risk level in the driving control step S40.

That is, when the distance between the host vehicle 1 and the other vehicle 2 is equal to or less than a predetermined reference distance, a risk level may be increased in the safety confirmation step S30, and braking power and braking timing may be upwardly corrected depending on the increased risk level in the driving control step S40.

Further, when a relative speed of the other vehicle 2 is equal to or higher than a predetermined reference speed, a risk level may be increased in the safety confirmation step S30, and braking power and braking timing may be upwardly corrected depending on the increased risk level in the driving control step S40.

When a risk level is determined according to the distance between the host vehicle 1 and the other vehicle 2 and a relative speed of the other vehicle 2, braking power and braking timing are corrected depending on the determined risk level, and the host vehicle 1 is braked with the corrected braking power at the corrected braking timing, as described above, the host vehicle 1 can respond to the other vehicle 2 detected in a curved section and safely avoid the other vehicle 2. Even if the host vehicle 1 cannot avoid the other vehicle 2, impact is reduced according to rapid braking.

A risk level may be decreased when a road state is determined to be an uphill road and increased when a road state is determined to be a downhill road in the safety confirmation step S30. In this manner, the risk level is decreased in the case of an uphill road having a low risk of driving to prevent excessive braking and increased in the case of a downhill road having a high risk of driving to secure driving safety through rapid braking.

Further, when a road state is determined to be an unpaved road, a risk level may be increased in the safety confirmation step S30. Normal braking can be performed in the case of a paved road, whereas normal braking may not be performed due to an uneven road surface in the case of an unpaved road. Accordingly, when the host vehicle 1 enters an unpaved road, the risk level is increased in the safety confirmation step S30, and braking power and braking timing are upwardly corrected in the driving control step S40.

Further, when a road state is determined to be a slippery condition, a risk level may be increased in the safety confirmation step S30. When a road state is determined to be a slippery condition through the road detection unit 20 in this manner, the risk level may be increased in the safety confirmation step S30, and braking power and braking timing may be upwardly corrected depending on the increased risk level in the driving control step S40. Accordingly, even when the host vehicles 1 skids off during braking, the host vehicle 1 can be stably braked.

Further, road signs may be detected and road information may be collected through the road signs in the object detection step S10, and a risk level may be determined on the basis of road information collected through road signs in the safety confirmation step S30.

That is, road signs installed on roads provide various types of road information, and the host vehicle 1 sets a risk level according to information collected through road signs. Such risk levels according to road signs may be stored in advance. When a risk level is determined on the basis of road signs, braking power and braking timing may be corrected to the determined risk level such that stable and safe braking can be performed.

According to the system and method for controlling driving of a vehicle configured as above, a vehicle can avoid an oncoming vehicle when traveling on a curved road and thus driving safety is ensured. Furthermore, it is possible to efficiently avoid an oncoming vehicle by performing braking depending on a degree of risk of collision of a vehicle and adjusting braking power and braking timing according to a road state to improve safety.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. A system for controlling driving of a host vehicle, the system comprising:
at least one processor configured to:
identify objects, including another vehicle, around the host vehicle;
collect object information about the objects;
collect road states information of road states in a traveling direction of the host vehicle;
identify an area that is free of the other vehicle or obstacles, and set the area as a safety zone for the host vehicle to travel to, based on the object information around the host vehicle and the road states information, wherein the safety zone does not extend beyond a centerline separating lanes in opposite traveling directions;
determine a risk level according to the object information about the objects around the host vehicle and the road states information in the safety zone;
increase the determined risk level when each condition among a distance between the host vehicle and the other vehicle being less than or equal to a reference distance, a relative speed of the other vehicle being greater or equal to a reference speed, the road being a downhill road, the road being an unpaved road, the road being wet, and information according to road signs, is satisfied;
reduce the determined risk level when each condition among a distance between the host vehicle and the other vehicle being greater than the reference distance, the relative speed of the other vehicle being less than the reference speed, and the road being an uphill road, is satisfied; and
control the host vehicle to travel to the safety zone, in response to the host vehicle entering a curved road and the other vehicle being detected to enter the traveling direction of the host vehicle from an opposite direction based on the determined risk level,
wherein the at least one processor is further configured to control a braking force and timing of the host vehicle in the safety zone such that the host vehicle reduces a travelling speed based on the determined risk level to avoid a collision with the other vehicle or to reduce an impact of a collision.

2. The system of claim 1, further comprising:
a memory configured to store instructions;
wherein the at least one processor, upon execution of the instructions, is configured to:
identify the objects, including the other vehicle, around the host vehicle and to collect the object information about the objects;
collect the road states information of the road states in the traveling direction of the host vehicle;
identify the safety zone for the host vehicle to travel based on the object information and the road states information; and
control the host vehicle to travel to the safety zone, in response to the other vehicle being detected in the traveling direction of the host vehicle and the host vehicle having entered the curved road.

3. The system of claim 1, wherein the at least one processor is further configured to:
identify road signs and collect road information through the road signs; and
determine a road information risk level based on the road information collected through the road signs.

4. The system of claim 1, wherein the at least one processor is included in engine control units (ECUs).

5. A method for controlling driving of a host vehicle, the method comprising:
- identifying objects, including another vehicle, around the host vehicle;
- collecting object information about the objects;
- collecting road states information of road states in a traveling direction of the host vehicle;
- identifying an area that is free of the other vehicle or obstacles, and setting the area as a safety zone for the host vehicle to travel to, based on the object information around the host vehicle and the road states information, wherein the safety zone does not extend beyond a centerline separating lanes in opposite traveling directions;
- determining a risk level according to the object information about the objects around the host vehicle and the road states information in the safety zone;
- increasing the determined risk level when each condition among a distance between the host vehicle and the other vehicle being less than or equal to a reference distance, a relative speed of the other vehicle being greater or equal to a reference speed, the road being a downhill road, the road being an unpaved road, the road being wet, and information according to road signs, is satisfied;
- reducing the determined risk level when each condition among a distance between the host vehicle and the other vehicle being greater than the reference distance, the relative speed of the other vehicle being less than the reference speed, and the road being an uphill road, is satisfied; and
- controlling the host vehicle to travel to the safety zone, in response to the host vehicle entering a curved road and the other vehicle being detected to enter the traveling direction of the host vehicle from an opposite direction based on the determined risk level,
- wherein the controlling of the host vehicle comprises controlling a braking force and timing of the host vehicle in the safety zone such that the host vehicle reduces a travelling speed based on the determined risk level to avoid a collision with the other vehicle or to reduce an impact of a collision.

6. The method of claim 5, wherein the controlling of the host vehicle comprises controlling the host vehicle to travel in a direction opposite to a direction in which the other vehicle approaches the host vehicle, in response to detection of the other vehicle on the curved road.

7. The method of claim 5, wherein the identifying of the safety zone comprises not setting a range extending beyond the centerline in lanes around the host vehicle as the safety zone.

8. The method of claim 5, wherein a safe distance between the host vehicle and an object is set when the object is present in the safety zone, and
- wherein the controlling of the host vehicle comprises separating the host vehicle from the object by the safe distance or longer when traveling to the safety zone.

9. The method of claim 5, wherein a distance risk level is determined according to a distance between the host vehicle and the other vehicle and a relative speed of the other vehicle in the safety confirmation operation, and
- wherein the controlling of the host vehicle comprises correcting the braking force and timing depending on the distance risk level.

10. The method of claim 9, wherein the distance risk level is increased when the distance between the host vehicle and the other vehicle is equal to or less than the reference distance, and
- wherein the controlling of the host vehicle comprises upwardly correcting the braking force and timing depending on the increase of the distance risk level.

11. The method of claim 9, wherein the distance risk level is increased when the relative speed of the other vehicle is equal to or higher than a reference speed, and
- wherein the controlling of the host vehicle comprises upwardly correcting the braking force and timing depending on the increase of the distance risk level.

12. A non-transitory computer-readable storage medium having recorded thereon at least one program comprising commands, which, when executed by a computer, causing at least one processor to perform operations comprising:
- identifying objects, including another vehicle, around the host vehicle;
- collecting object information about the objects;
- collecting road states information of road states in a traveling direction of the host vehicle;
- identifying an area that is free of the other vehicle or obstacles, and set the area as a safety zone for the host vehicle to travel to, based on the object information around the host vehicle and the road states information, wherein the safety zone does not extend beyond a centerline separating lanes in opposite directions;
- determining a risk level according to the object information about the objects around the host vehicle and the road states information in the safety zone;
- increasing the determined risk level when each condition among a distance between the host vehicle and the other vehicle being less than or equal to a reference distance, a relative speed of the other vehicle being greater or equal to a reference speed, the road being a downhill road, the road being an unpaved road, the road being wet, and information according to road signs, is satisfied;
- reducing the determined risk level when each condition among a distance between the host vehicle and the other vehicle being greater than the reference distance, the relative speed of the other vehicle being less than the reference speed, and the road being an uphill road, is satisfied; and
- controlling the host vehicle to travel to the safety zone, in response to the host vehicle entering a curved road and the other vehicle being detected to enter the traveling direction of the host vehicle from an opposite direction based on the determined risk level,
- wherein the controlling of the host vehicle comprises controlling a braking force and timing of the host vehicle in the safety zone such that the host vehicle reduces a travelling speed based on the determined risk level to avoid a collision with the other vehicle or to reduce an impact of a collision.

* * * * *